US011928188B1

(12) United States Patent
McCown et al.

(10) Patent No.: US 11,928,188 B1
(45) Date of Patent: Mar. 12, 2024

(54) APPARATUS AND METHOD FOR PERSISTENT DIGITAL RIGHTS MANAGEMENT

(71) Applicant: Anonyome Labs, Inc., Salt Lake City, UT (US)

(72) Inventors: Steven Harvey McCown, Mapleton, UT (US); Paul Ashley, Toowong (AU); Neil Readshaw, Draper, UT (US); John David Mumford, Portola Valley, CA (US); Tim Bartley, Draper, UT (US)

(73) Assignee: Anonyome Labs, Inc., Salt Lake City, UT (US)

( * ) Notice: Subject to any disclaimer, the term of this patent is extended or adjusted under 35 U.S.C. 154(b) by 251 days.

(21) Appl. No.: 17/530,843

(22) Filed: Nov. 19, 2021

Related U.S. Application Data

(60) Provisional application No. 63/117,609, filed on Nov. 24, 2020.

(51) Int. Cl.
*G06F 21/10* (2013.01)
*H04L 9/08* (2006.01)

(52) U.S. Cl.
CPC .............. *G06F 21/10* (2013.01); *H04L 9/085* (2013.01); *G06F 21/107* (2023.08)

(58) Field of Classification Search
CPC ......... G06F 21/10; G06F 21/107; H04L 9/085
USPC ............................................................. 726/26
See application file for complete search history.

(56) References Cited

U.S. PATENT DOCUMENTS

| | | | |
|---|---|---|---|
| 10,268,805 B2 * | 4/2019 | Wohlert | G06F 21/10 |
| 2015/0127940 A1 * | 5/2015 | Polehn | H04N 21/26613 713/168 |
| 2017/0344728 A1 * | 11/2017 | Steele | H04L 9/3231 |
| 2019/0362054 A1 * | 11/2019 | Diehl | G06F 21/10 |
| 2020/0117771 A1 * | 4/2020 | Bae | H04L 9/3234 |
| 2020/0344511 A1 * | 10/2020 | Cho | G06Q 20/385 |

\* cited by examiner

*Primary Examiner* — Michael S McNally
(74) *Attorney, Agent, or Firm* — Cooley LLP

(57) ABSTRACT

A machine has a network interface circuit to provide connectivity to networked machines. A processor is connected to the network interface circuit. A memory is connected to the processor and the network interface circuit. The memory stores instructions executed by the processor to record the purchase of a digital asset by a user at a client machine from a data source machine in network communication with the client machine. The location of the digital asset on one or more machines of the networked machines is archived. The location is separate from the data source machine. The digital asset is associated with a data access policy. A request for the digital asset is received. The data access policy is enforced through programmatic control utilized by one or more of the networked machines to form a consent state. Distribution of the digital asset to a networked machine is authorized in response to the consent state.

7 Claims, 4 Drawing Sheets

APPARATUS AND METHOD FOR PERSISTENT DIGITAL RIGHTS MANAGEMENT

CROSS-REFERENCE TO RELATED APPLICATION

This application claims priority to U.S. Provisional Patent Application Ser. No. 63/117,609, filed Nov. 24, 2020, the contents of which are incorporated herein by reference.

FIELD OF THE INVENTION

This invention relates generally to digital rights management in computer networks. More particularly, this invention is directed toward techniques for persistent digital rights management.

BACKGROUND OF THE INVENTION

The purpose of Digital Rights Management (DRM) technologies is to control the distribution and usage of copyrighted digital content to ensure that copyright holders are compensated for their works according to specified terms. DRM is widely applied to control the distribution of movies, music, ebook distribution, software application installation, video conferences, video conference recordings, and even to control access to premium hardware functions, such as in-dash maps navigation or driver assisted driving functionality. A useful DRM system will balance security, ease of use, high availability, longevity, and enforceability.

Overcoming the vulnerabilities and attacks present with traditional DRM architectures, multiple technology methods are combined. On both server-based hardware and on individual consumer devices, such methods include strong cryptographic identity methods (i.e., Decentralized Identity), strong cryptographic operations and key exchange capabilities, a security enhanced client operating system (e.g., iOS, macOS), and an isolated (but integrated) piece of security hardware known as a Secure Enclave (manages cryptographic keys and security functions in a separate hardware space from the host OS applications and functions).

Control and management of DRM-protected resources requires a strong cryptographic identity infrastructure. The Decentralized Identity ecosystem includes several core elements:

1) Decentralized Identifiers (DIDs): a W3C identity standard created to enable private and non-repudiable cryptographic communication, contract signatures, verification, etc.
2) Cryptographic Identity Wallets: a secure storage database (often hardware-based) that protects a variety of DIDs, identity information, encryption keys, licensing tokens, etc.
3) Decentralized Ledger Utilities: utilities to access an immutable and decentralized cryptographic ledger to verify identities, licenses, digital signatures, etc.
4) Identity-Based Cryptographic Communication Protocols: standardized cryptographic communication protocols for use with Decentralized Identity infrastructures.
5) Verifiable Credentials: tokens and algorithms to prove possession of a credential without having to contact the token issuer or reveal the details of the credential, itself.

The preceding items are critical to identifying the participants in a DRM ecosystem and provide fast cryptographic processes that enable all activity to be authenticated and validated.

Modern cell phones, computers, laptops, tablets, etc. now include a protected security chip that performs encryption key management, encryption algorithms, key exchanges (e.g., Elliptic Curve Integrated Encryption Scheme, ECIES), etc., so that the related data and operations are kept physically separate from the main computing hardware and operating system. Keeping the sensitive encryption keys and algorithms in a separate hardware space from the main CPU and memory makes DRM significantly less susceptible to compromise.

During video teleconferences, for example, meeting artifacts (e.g., video, audio, chat messages, documents, images, etc.) may be compressed as a .zip file and encrypted using a symmetric encryption process. Distributing the meeting artifacts requires securely distributing the decryption key in a way that its distribution can be monitored, controlled, and revoked. The DRM application controls this process using the secure key exchange methods and hardware, as described above.

Secure operation of the DRM Access Control function requires a secure computing environment that can verify whether the DRM Access Control function has not been compromised. One example of this is the Apple DeviceCheck service framework and App Attest API, which may be used to ensure that the DRM Access Control function has not been compromised. These checks can be performed upon application launch, each time the DRM Access Control function needs to access a secure server function (e.g., requesting a new content access key), or at random intervals.

SUMMARY OF THE INVENTION

A machine has a network interface circuit to provide connectivity to networked machines. A processor is connected to the network interface circuit. A memory is connected to the processor and the network interface circuit. The memory stores instructions executed by the processor to record the purchase of a digital asset by a user at a client machine from a data source machine in network communication with the client machine. The location of the digital asset on one or more machines of the networked machines is archived. The location is separate from the data source machine. The digital asset is associated with a data access policy. A request for the digital asset is received. The data access policy is enforced through programmatic control utilized by one or more of the networked machines to form a consent state. Distribution of the digital asset to a networked machine is authorized in response to the consent state.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
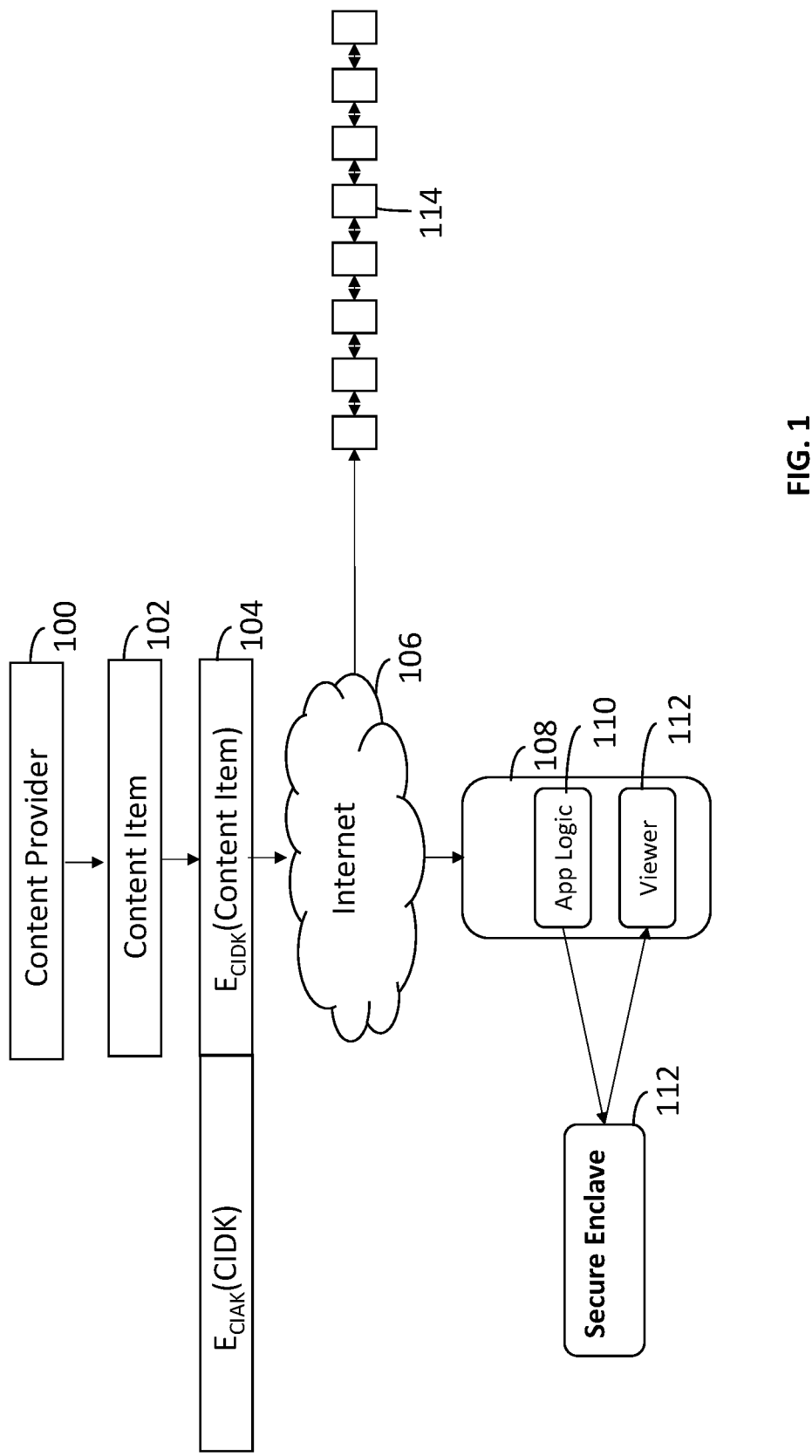
FIG. 1 illustrates a DRM architecture configured in accordance with an embodiment of the invention.

FIG. 1 illustrates a content provide 100 creating a piece of content 102. For example, the content item 102 is a recording that can be transformed to encrypted content 104. The encrypted content is formed with a symmetric key. The encrypted content is delivered via the internet 106 to a client device 108. The client device may be a Smart Phone or a laptop/desktop with a processor and memory. The memory stores instructions executed by the processor to implement operations discussed herein. The processor may execute application logic 110, which interacts with a secure enclave 112. The secure enclave 112 is isolated hardware on the client device 108 for secure storage and processing. The symmetric key is stored in the secure enclave 112. The secure enclave 112 performs license verification, permissioned decryption and secure playback of the DRM-protected content. The decrypted content may be viewed and/or heard in a viewer 112 on the client device 108.

A more detailed characterization of these operations is as follows.
1. Customer
    a. Installs application logic 110 associated with the content provider 100.
    b. Verifies the integrity of the application logic 110 (e.g., for Apple devices, this is done via the Apple App Attest API).
2. Content Provider
    a. Creates a Content Item, which is a collection/package containing:
        i. Elements to be DRM protected (e.g., teleconference video recording).
        ii. Policy by which to manage the DRM-protected elements.
    b. Creates a symmetric encryption key (Content Item Decryption Key or CIDK).
    c. Uses CIDK to encrypt the Content Item.
    d. Uses the ECIES key exchange process to generate a shared encryption key with a Customer's computing device.
    e. Encrypts CIDK with the ECIES-generated key (Content Item Access Key or CIAK).
    f. Concatenates the $E_{CIAK}$(CIDK) with $E_{CIDK}$(Content Item) into a Content Item Download Package (CIDP).
3. Customer
    a. Uses the application logic 110 to download the CIDP.
    b. The application logic 110
        i. Uses the CIAK (previously generated via ECIES in the Secure Enclave 112) to decrypt the CIDK.
        ii. Uses the CIDK to decrypt the Content Item.
        ii. Decompresses/de-packages the Content Item elements.
        iv. Validates and processes the Policy and performs the steps required by the Policy.
        v. Presents the Content Item to the Customer (e.g., 'playing' if the CI is a video).
        vi. Deletes the Content Item after it is presented to the Customer.
        vii. Cleans up the Content Item access process according to the terms of the Policy (e.g., deletes the Content Item, decrements the max number of accesses counter, etc.) and logs the results.
        viii. These operations may be recorded on a decentralized ledger 114.

The DRM architecture can be enhanced with a secure decentralized file storage method to make files continuously available for download and not easily removed from circulation. In this case, a decentralized service, such as BitTorrent or the blockchain-based Interplanetary File System may be used.

DRM processes are often accompanied with Terms of Service or a Policy that describes how the digital content can be used. A Policy might state that a digital item may only be used by one person, the buyer's family, used one time, or even have a perpetual license. As with Compact Disks (e.g., music), sometimes the Policy is stated, but not enforced through technology. Other times, cryptographic measures are added to enforce the policy, as is the case with DVDs (e.g., movies). Depending on how the DRM technology is deployed, sometimes it can be easily circumvented while in other instances it is more secure. The goal of any DRM system is to enforce the Policy according to its specified terms. The following are examples of different types of Policies that can be used by DRM processes to enforce the Terms of Service as set by the copyright owner:

Videoconference Call Recordings
   Each meeting participant receives non-transferrable access to meeting recordings.
   Non-attendees may purchase limited access to meeting recordings.
   Expired limited-use licenses trigger an automatic revocation of previously accessible recordings.
Entertainment Media Distribution
   Customers receive permanent access to purchased digital media.
   Rented digital media provides limited and revokable access to digital media.
Telehealth
   Patients convey revokable authorization to medical providers to transmit encrypted medical data over digital transports (e.g., email, SMS, private messaging, etc.).
   Encrypt patient-doctor communications during individual calls.
   Patients revoking their authorization to medical providers trigger the deletion of their previously authorized data.

Policy Management is a collection of processes that combine to enforce the various terms contained within a specified Policy. The types of terms can vary widely, but contain some common base elements, such as:
1. Secure: Content Items are secured with strong cryptography and well-controlled decryption key management.
2. Access: Access to Content Items is provided using a decryption key to access the encrypted content. Keys may be distributed in hardware or via software methods.
3. Limited: When limited access to Content Items is granted, it can then be revoked by expiring or deleting cryptographic access keys.
4. Exchanged: Secure access to one Content Item may be exchanged for access to another Cryptographic Item by expiring the cryptographic keys for the exchanged item and issuing new keys for the new item.
5. Receipts: Permanent or limited access to Content Items may be cryptographically recorded for later verification using immutable recordings, such as a blockchain.

A DRM Policy may be defined or implemented in a variety of ways. At its most basic level, a DRM Policy is implemented as an immutable and cryptographically verifiable stored fragment of executable software (e.g., smart contract) that operates on a set of data specifying the terms of the DRM Policy. When viewed by its data elements, a Policy can have features such as shown in Table I

TABLE I

| | |
|---|---|
| Contract ID: | [DID \| URI] |
| Object (file): | [DID \| URI] |
| Licensor: | [DID] |
| Licensee: | [DID] |
| Access: | [Unlimited, Single, Number] |
| Transferrable: | [Yes \| No] |
| Device Portable: | [Single \| All User \| Family] |
| Time Limited: | [Unlimited \| Epocs] |
| Authentication: | [DID] |
| DIDDoc: | [URI \| inline information] |
| Signature: | [base58 encoded signature data] |

In the above depiction, the Policy denotes a Contract ID by using a Decentralized Identifier, which is a globally unique value. Each Contract ID will refer to a specific contract type that could be used for a particular music album or movie title. The Object of that contract would refer to the actual location where the encrypted content can be retrieved. This could be a local file, an object in an internet accessible database, an object in a decentralized database (e.g., IPFS), etc. Since the file is encrypted, it can be stored in a variety of locations. The Licensor is a unique ID referring to the copyright holder. The Licensee is a unique ID corresponding to the purchaser/holder of the license. The Access field refers to what type of content access is referred to in the license (e.g., single use, N number of access, or a perpetual license). Transferrable is a binary value denoting whether a licensee can transfer their license (e.g., 'purchased' content) to another user. Device Portable denotes a single user can use the licensed content on more than one device they or their family members own. Time Limited refers to whether the Content Item carries a perpetual license or whether it is set to expire after a specific amount of time (e.g., 24 hours, 7 days, 1 month, etc.). The Authentication field is used to describe the contract's authentication algorithm and may take on a variety of algorithms or protocols. In the above example, the Authentication field denotes a public (or permissioned) Licensor DID that is used to authenticate the Policy. The DIDDoc field could be added to designate DIDDoc information, which usually refers to routing information, public keys, etc. The Signature field contains the digital signature of the Licensor and is used to verify the integrity of the Policy. While this Policy example contains the items described, it is important to note that any copyright holder may customize the Policy and its fields however they choose. The only requirement on customized Policies is that the Player App(s) that interpret them will need to also be able to process, interpret, and fulfill the terms of the Policy.

Policy Management provides a safe way to distribute digital Content Items and limit their usage according to tailorable Terms of Service. Unique Policies can be created according to the Licensor and customized by individual Content Items or even individual customers.

One of the problems with current DRM solutions is that they often use methods and hardware locations that leave them susceptible to manipulation. The descriptions presented herein introduce advanced cryptography, secure key exchange methods, Player App integrity verifications, secure hardware, etc. that will keep the DRM processes secure. These provide very customer friendly solutions that can be operated without any noticeable encumbrance on usability. However, there are other scenarios that it would be advantageous for an adaptable DRM solution to address. Namely, what happens to purchased (permanently licensed) content when the vendor:
1) Ceases all business operations.
2) Terminates the licensed content sales line of business.
3) Sells some or all of licensed content sales line of business to another vendor.
4) Loses their license to resell the digital content.
5) Realizes that a customer has passed away.

In contemporary scenarios, digital licensed content vendors often 'rent' content for a short time or offer for customers to 'buy' the content. For whatever reason, content vendors often rely on legal Terms of Service that stipulate that no content is actually being purchased, but is instead 'leased' under a usage license with an undefined term. This legal language provides the vendor with the ability to end the long-term lease when some events are realized. This leaves customers with the perception that they have purchased the licensed content when in reality a variety of events can trigger the end of the content lease and leave them without ongoing access. Several scenarios can result in the customers losing access to their purchased content despite having clicked the 'buy' button. These scenarios can be resolved through a new Terms of Service that is facilitated by a new type of Decentralized Policy Management.

Decentralized Policy Management provides a way to operate the Policy Management functions according to specified customizable Policies, but do so at an arm's length distance from the licensed content vendor. By separating the operation and enforcement of the Policy Management function from the vendor, the vendor can still sell licenses (rented or permanent). However, the novel advantage of Decentralized Policy Management is that the customer is protected against changing business operations experienced by the vendor. This type of licensing also facilitates the inheritance of digital works to heirs similar to how physical assets are passed down, today.

In order to accomplish Decentralized Policy Management with this novel functionality, three new processes are required: decentralized storage of encrypted Content Items, smart contract governance of managed Policies, and Policy Management generalized for managing access to digital files.

Decentralized File Storage: Decentralized file storage services shall provide a long-term, survivable, fault-tolerant storage facility that is independent of the license vendor. Such services have the following attributes:
  Content Items are encrypted using strong encryption.
  Content Items are stored on a decentralized storage architecture (e.g., BitTorrent, IPFS, a blockchain, etc.).
  Blocks/files containing Content Items are indexed and discoverable via pre-defined algorithms (e.g., hashing, file pinning, Directed Acyclic Graphs, etc.).

Smart Contracts: Smart contracts are immutable services that are located on a blockchain. Customers can purchase (from a vendor) a token that is redeemable by a smart contract that will issue a license token that can be used to access the purchased content. Using smart contracts on a ledger allows them to operate independent of the business operation of the vendor. Smart contracts have the following attributes:
  In one embodiment, implemented using Ethereum's Decentralized Applications ('Dapps').
  Dapps are written using the Solidity programming language.
  Provide verifiable and decentralized contract software and data across the Ethereum network.

Policy Management for File Access: policy management is established to grant independent access to a decentralized stored file (containing a Content Item). This Policy Management service has the following attributes:

Each file (containing a Content Item) is protected by strong encryption.

Access to decrypt a file is controlled via the execution of an individual smart contract.

Executing the Smart Contract.

Verifies a user's identity by validating either proof of ownership of a decentralized identifier or presentation of a verifiable credential (e.g., ZKP).

Links a customer's access to the Terms of Service Policy version (containing a customizable set of usage terms and conditions for access) that is most current at the time the customer executes the smart contract.

Creates a customer-specific access token (e.g., decryption key using the previously described DRM processes) that will access a specific file, and which will be held by the customer.

Linked Policy is linked cryptographically to an authorized Player App (e.g., application logic 110), which is secured by the Secure Enclave 112.

May write an immutable record of the execution outcome (e.g., user 1 is granted access or user 2 is denied access).

Using these decentralized storage, contract execution, and key exchange methods, the licensing and Policy Management processes can be operated externally from the vendor and persist beyond any business or operational restructuring by the vendor.

Figure 2:
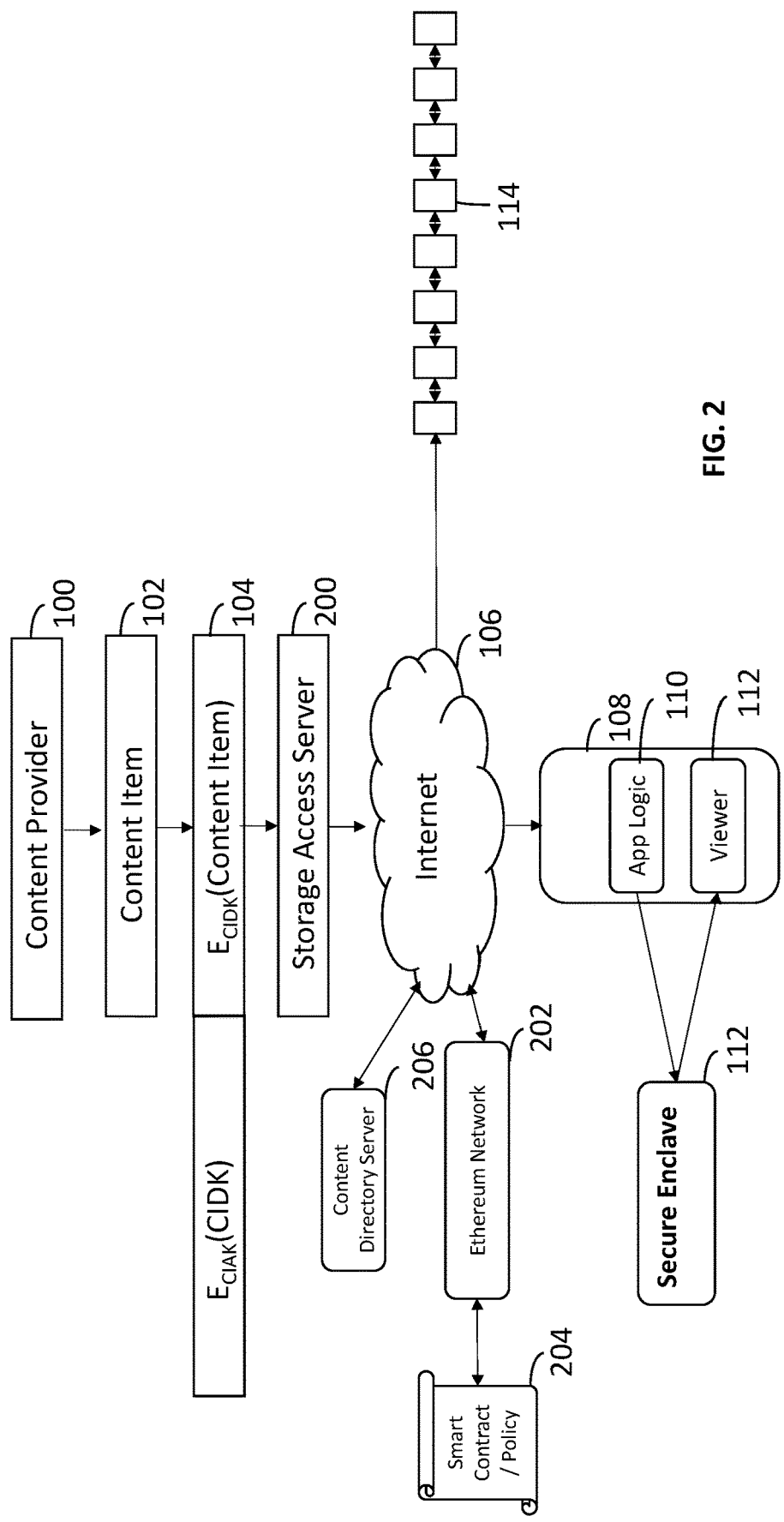
FIG. 2 illustrates another DRM architecture configured in accordance with an embodiment of the invention.

The enhanced DRM process combines key aspects of several novel technologies. It creates an environment where file storage takes on the decentralized and replicated aspects of services like BitTorrent or the blockchain to ensure that digital items that customers purchase are kept available. It adds the functionality of smart contracts (e.g., Ethereum), so that customers can purchase, and copyright holders can get paid, without the negative privacy potential (e.g., hacked customer purchase databases) that accompanies today's eCommerce platforms. Using advanced encryption, key exchange, and hardware-based security, the proposed DRM solution significantly enhances the security of digital copyrighted items. Combining all of these features protects the customer's interests, so that digital items they have purchased cannot be accidentally or intentionally withdrawn from their possession. This combination of technologies simultaneously benefits copyright holders, as well, and is depicted in FIG. 2.

1) Install a Player App: The first step for users is to install a Player App or App Logic 110 that implements the DRM process. The Player App can be a mobile app, desktop application, or potentially a verifiable web application. Prior to being certified to distribute DRM-protected content, it undergoes a security analysis and verification process to ensure that it is compliant with the DRM process requirements and that it passes specified security criteria (e.g., uses the Secure Enclave 112, is free from known vulnerabilities, etc.). Upon installation, this app undergoes some post-installation security checks, such as verifications through Apple's App Attest API or Intel's Remote Attestation checks. This helps ensure that the app that was delivered through the app store is the same app that the app provider created and made available for consumer use.

2) User Selects a Content Item: the user will connect with an online content vendor 100 to select a Content Item 102 of interest. This can be done through an authorized Player App, a regular web browser, or some other mechanism. FIG. 206 shows a Content Directory Server 206, but it could also be in the form of a decentralized storage mechanism, an advertisement message/post, shared from a friend, etc. Once the Content Item is selected, its identifier is provided to the client device 108 which continues the purchase and licensing processes.

3) User Executes a Smart Contract and Purchases Access to the Content Item: When the copyright holder makes their Content Item available for sale, they (or a designated agent) creates a Smart Contract 204 that will manage (e.g., via the Ethereum network 202) the unattended sales and product licensing processes, so that users can purchase content privately, securely, and independent of the business continuity of the vendor. The Smart Contract coordinates the payment remittance (e.g., using crypto currency, fiat, or proxy payment method) between the user to ensure that the requisite funds are collected and dispersed to the copyright holder, holder's agent, vendor, etc. as stipulated in the customizable smart contract.

4) Smart Contract returns Access Token and Policy: Once payment has been verified, the smart contract will return an Access Token and ToS Policy (also available for review prior to the sale) to the Player App. This Access Token is usable only by the customer to whom it was issued and is used to initiate the generation of the CIAK as specified in the DRM process.

5) Player App Remits Access Token to the Storage Access Server Network (SASN): the purpose of the Access Token is to validate that an authenticated purchase of a Content Item has been made and to initiate the exchange of the CIAK from the copyright holders (or their agent's) secure computing device to the customer's secure computing device. To initiate this process, the Player App remits the Access Token to the Storage Access Network Server 200. While the Storage Access Network Server is described as a 'server', it can also be embodied as a decentralized storage mechanism or other secure computing device with a hardware security module or similar security mechanism. Remitting the Access Token can be done via a similar Smart Contract, Decentralized Identity method of verifying Verifiable Credentials, etc.

6) SASN Process Access Token: The SASN receives and processes the Access Token using a secure encryption key generation and exchange process as described above. Using the secure exchange method (e.g., ECIES), the SASN exchanges messages with a customer's device so that a resulting CIAK is generated on the customer's device. The generated CIAK (unique to each customer and Content Item) is not actually stored on the customer's device, but is reconstructed locally each time the Customer accesses the protected content.

7) Stores DRM-Based Tokens and Encrypted Content Item: After the exchange process, the values necessary to reconstruct the CIAK on demand will be stored on the customer's device and together with the ephemeral private key (used in the ECIES process) generated in the customer's Secure Enclave 112 will be ready for them to use when accessing the Content Item. As specified, the main CIAK reconstruction element is not be extractable from the Secure Enclave. The encrypted Content Item will also be downloaded to the customer's device.

8) Player App Enables Access to the Content Item: using the DRM processes described above, the Player App decrypts access to the Content Item using the CIAK and controls access operations according to the Content Item's Policy prepared for the customer at time of purchase. While not depicted in FIG. 2, subsequent Policy actions can include allowing the user to access the Content Item a single time, throughout a specified timeframe, or even perpetual access.

The system described above has many security features, protocols, servers, user applications, and hardware devices that are used together to provide strong DRM protections to important Content Items. This functionality described is complex, but the system as described is manageable. In the DRM system presented, the system will require very few user steps. After installing the necessary Player App from the device's app store, the user will run the app and make a purchase as follows:

1. User selects Content Item from Content Directory Server 206 or content provider 100.
2. User authorizes payment or accepts granted access.
3. User presses 'play' to access content.

At this point, the user can access the Content Item purchased and use it according to the accompanying Policy. At such a point that the Policy stipulates expiring the customer's access the Player App can simply delete the Content Item or it can prompt the user to renew (if allowed) the DRM license by doing the following:

1. Player App notifies user that Content Is expiring.
2. Player App prompts user to renew.
3. User selects 'Yes' or 'No''.

In both scenarios, the user can accomplish the task using a very minimal set of user interactions. Behind these simple user steps, the advanced cryptography, file download, policy management, etc. as described above are performed in the background. This simplified process makes for an enjoyable user experience while sparing the user from the underlying complexity.

The DRM system and method as described above offers a flexible method of controlling digital Content Items using strong encryption, decentralized storage and operations, and customizable Policy Management. In addition to the standard scenarios for decentralized DRM, the system may also be extended in many other directions to protect other types of digital information or to extend the control Policies using multiple participants. The following sections provide some very intriguing examples of how the decentralized DRM system may be used.

In the standard case, using the new DRM method to control access to a Content Item requires a single delegation from the Content Item's owner and functions as described above. In other cases, it may be desirable to issue delegated access to a group of multiple participants. In this situation, either all or a specified multiplicity (e.g., 4 out of 5) of the parties will need to collectively initiate an access attempt for a Content Item before access is granted. In order to issue an access credential, a multi-party key generation process (e.g., Shamir Secret Sharing) will need to be performed.

A multi-party key generation process is a method by which a decryption key is divided into N pieces or 'shards' with each piece being given to each one of the participants in the group requesting access. The reason that a decryption key is divided into N parts is so that all N participants must cooperate in order for them to access the Content Item that was secured. This process ensures that no individual (or subset of the whole) participant may independently decrypt a Content Item without the participation of the others. In other scenarios, it may be desirable for a subset of the whole to cooperate (independent of the majority) and access the Content Item. In this scenario, extra key bits would be created and divided amongst the various participants in order to later re-create a remaining part of the decryption key.

In the DRM process as described, a DRM Policy may specify that participation of all parties of the multi-party key process cooperate before access to the Content Item can be achieved. In other scenarios, a subset of parties (e.g., 4/5, 2/3, etc.) may be required to access the Content Item. When a DRM Policy specifies a subset of the group of participants, a commensurate multi-party key generation process (with appropriate parity) must be used.

The benefits of this process include: requires cooperation of the requisite number of shard holders, a lesser subset cannot cooperate independently to recreate the decryption key, etc. The shortcomings of this method are that there are no limits of when shards may be reunited or record of when a rejoining takes place.

In one example, a user chooses to purchase a digital Content Item, such as a video. Videos are expensive to make and are of high value, so it the decentralized DRM system will enhance the video's security. In this scenario, the vendor allows the user to access the video only during business hours, so they can answer any questions that the user has with the information content. Here are the steps required for a user to purchase the video and access it according to the specified Policy:

1. Purchase: user navigates to the vendor's website, selects a video (Content Item), and initiates a purchase:
    1. Content Item is encrypted with a symmetric key (CIDK).
    2. CIDK is encrypted with a separate encryption key (CIAK).
    3. CIAK is divided into N shards (e.g., 2).
    4. User purchases a time-limited license to access the Content Item and receives:
        1. A key shard of the CIAK.
        2. Usage Policy (e.g., single use, multi-use, etc.) that informs them of the usage rights and restrictions, which they must accept.
        3. Downloads the Content Item, Policy, and license key.
2. Access: in order to access the Content Item, the user must add the downloads to an authorized Player App (if they did not use it to purchase the Content Item)
    1. Before opening the Content Item, Player App requests the other CIAK shard from the vendor.
    2. Shard is securely installed into the Player App (this shard will be managed according to the specified Policy and may be deleted after use or otherwise expired as per the Policy).
    3. CIAK is reassembled, CIDK is decrypted, the Content Item decrypted, and the Content Item accessed.
3. Post-Access
    1. If the Usage Policy stated that access was for a 'single use', then the CIAK is destroyed by the Player App.
    2. For multi-use, the CIAK may be locally recreated.
    3. For time-limited use, the CIAK and the $2^{nd}$ shard deleted are marked for deletion at a certain time.

4. Update Usage Policy Management
   1. The access is logged (locally and remotely).
   2. The 'accesses remaining' counter in the Usage Policy is decremented and updated (locally and remotely).

In another example, a user joins a group to access a Content Item (e.g., shared document)
1. Setup
   1. Content Item producer encrypts a Content Item with a symmetric key (CIDK).
   2. CIDK is encrypted with a separate encryption key (CIAK).
   3. CIAK is divided into N shards (e.g., 6 as an example).
   4. User and 5 partners join an access group that collectively gains access to a Content Item and receives:
      1. A key shard of the CIAK.
      2. Usage Policy (e.g., 5 of 6 key shards required to access CI) to inform the user and operate the Player App.
2. Access (Smart Contract implementation)
   1. Before opening the Content Item, Player App requests the other CIAK shards from Group (and offers theirs).
   2. Shards are securely exchanged, collected, and provided to the Player App.
   3. CIAK is reassembled, CIDK is decrypted, the Content Item decrypted, and the Content Item accessed.
3. Post-Access
   1. If the Usage Policy stated that access was for a 'single use', then the CIAK is destroyed by the Player App.
   2. For multi-use, the CIAK may be locally regenerated.
   3. For time-limited use, the CIAK and the $2^{nd}$ shard deleted are marked for deletion at a certain time.
4. Update Usage Policy Management
   1. The access is logged (locally and remotely with the group).
   2. The 'accesses remaining' counter in the Usage Policy is decremented and updated (locally and remotely).

Consider the case of cryptographically controlled law enforcement access. In the United States and other countries, the respective governments have expressed a concern over what they are calling "warrant-proof encryption". This term refers to law enforcement's inability to access the plaintext contents of encrypted data even when a legal and lawful search warrant is presented. In order to address encrypted data, many governments are discussing legislations that would weaken cryptography, require key escrow, or even mandate backdoors be installed in vendor software. These measures, while having law enforcement benefits, will make modern communications, eCommerce, and digital product ownership much less secure and prone to compromise.

As an alternative to compromising the effectiveness of modern cryptography or leaving law enforcement without options, the Anonymity with Recourse (AWR) system has been designed as a middle ground to balance law enforcement needs with user needs. In the AWR system, a specific digital item (e.g., cryptographic key) is designated to be singularly and privately controlled by the owner, but to be accessible under a cryptographically controlled set of policy specifications, procedures, and access disclosure requirements.

Figure 3:
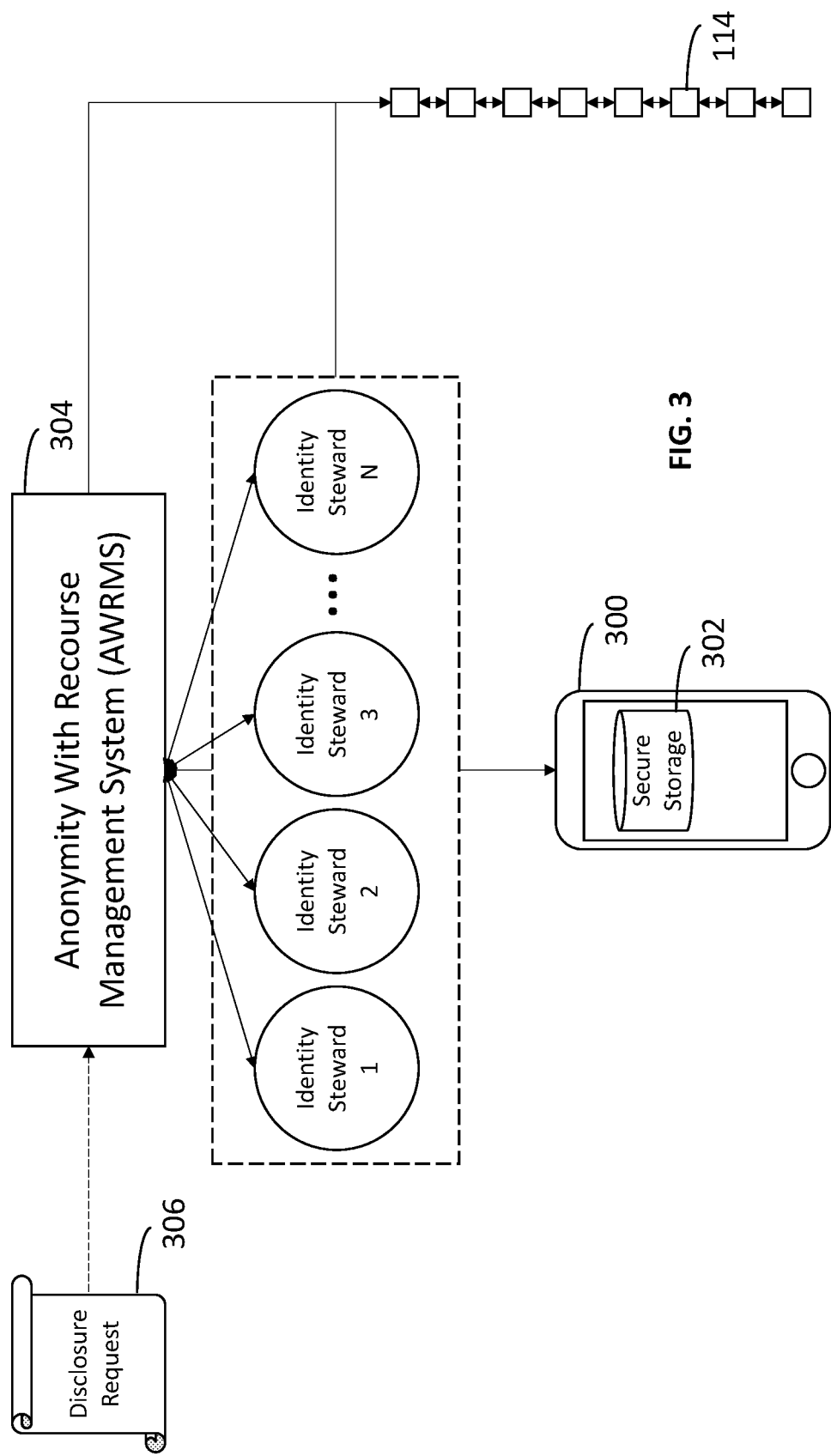
FIG. 3 illustrates an anonymity with recourse management system configured in accordance with an embodiment of the invention.

As shown in FIG. 3, under the AWR process, an AWR-compliant cryptographic application (e.g., messaging app) is first launched by a user and presents a set of Terms of Service Policy that binds to the application's user and provider to a set of privacy and disclosure terms. The Policy (e.g., terms plus Smart Contract) will state that the customer will create one or more encryption keys that will be securely stored only in the user device 300 secure storage 302 (e.g., enclave). These keys can be used to encrypt and decrypt information for a variety of purposes (e.g., communication, commerce, licensing, etc.). The Policy also states that the keys may be recoverable by a designated authority under specified conditions. The purpose of AWR is to enforce the terms of the Policy by keeping the keys inaccessible until specified legal and cryptographic conditions are met.

1. AWR Stewards (e.g., Identity Stewards 1 through N in FIG. 3)
   a. A group (size N) of AWR Stewards is chosen from a group of competing entities with divergent interests (e.g., civil rights groups, law enforcement, court of law, appeals court, etc.).
   b. Evaluate Data Item Access Requests for legality, compliance with the signed Policy, etc.
2. AWR-Enabled User App:
   a. Generates encryption keys in the Secure Enclave.
   b. Enrolls specified encryption keys in the AWR.
      i. Creates a Partial Access Token (one for each of the AWR Stewards) by generating a Multi-Party Key (e.g., via Shamir Secret Sharing or similar).
      ii. Securely transmits a unique Partial Access Token to each of the AWR Stewards who will securely store the token and its attributes.
3. Law Enforcement
   a. Issues a Data Item Access Request 306 to the AWRMS 304.
4. AWR Stewards
   a. Each Steward independently receives a Data Item Access Request and logs the event on an immutable ledger 114 for subsequent auditing.
   b. Evaluates Data Item Access Requests for legality, compliance with the Policy, etc.
      i. Non-compliant requests are rejected (and logged).
      ii. Compliant requests:
         1. Each Steward securely transmits the corresponding Partial Access Token to the AWR-Enabled User App on the user device specified in the Data Item Access Request.
         2. Logs the event on an immutable ledger 114.
5. AWR-Enabled User App
   a. Collects each Partial Access Token from the AWR Stewards.
   b. When all of the Partial Access Tokens are received, the disclosure process described in the Policy is performed, such as:
      i. Retrieval of the protected data item.
      ii. Secure transmission of the protected data item to a specified location.
      iii. The event is logged on an immutable ledger for subsequent auditing.

This process leverages both human interests with cryptographic processes to balance securing encryption keys, while making targeted disclosure possible. The competing human interests help secure the process by enabling them to evaluate a disclosure request and refuse to honor it if the request does not meet both legal requirements and the disclosure terms set out in the cryptographically-signed Policy or to honor the request if the proper disclosure criteria are met. Similarly, even when the governing humans from each of the AWR Steward organizations are in concurrence, the cryptographic processes employed require the full reassembly of each of the Partial Access Tokens. The combination of humans with mutually competing interests with cryptographic algorithms is set forth to balance the needs of users with law enforcement. This system is proposed to provide a security versus disclosure balance that is intended to eliminate the need for governments to mandate very risky alternatives, such as key escrow or system backdoors.

The Anonymity With Recourse system as described above enables a user to voluntarily enroll in a system whereby protected information, such as encryption keys, may be electronically recovered after human AWR Stewards judge that such a request is legal, lawful, and in compliance with the Policy that a user entered into when they installed the app, created, the key, accepted a periodic revision of Policy terms, etc.

Another important scenario occurs when a user owns a set of encryption keys, website passwords, crypto currency credentials, licensed access to Content Items, etc. and they pass away. After the user's death, if they were the sole custodians of a cryptographic data store of information, their heirs need a technological method for accessing the decedent's information, which they are inheriting. Unless prior planning (or subsequent and successful hacking) takes place, the protected information may be lost despite the heirs' legal and lawful claims on the protected information.

In this scenario regarding the inheritance of protected digital assets, a variation on the Anonymity With Recourse system can enable the decedent (while still living) to designate custodians and/or executors that will act on the decedent's wishes once they have confirmation of death. In this scenario, the executors function like the AWR Stewards described above in that they will require proof that the decedent has passed away (e.g., a legal death certificate) upon which they can remit their recovery keys similarly to how the AWR Stewards authorize a disclosure of the protected content.

Digital Inheritance operates by:
1. Digital Inheritance Stewards
   a. A group (size N) of Digital Inheritance Stewards is chosen from a group of competing entities with divergent interests (e.g., relatives, decedent's attorney probate court of law, etc.).
   b. Will evaluate Data Item Access Requests for legality, compliance with the signed Policy, etc.
2. Digital Inheritance-Enabled User App:
   a. Generates encryption keys in the Secure Enclave.
   b. Enrolls specified encryption keys in the Digital Inheritance system.
      i. Creates a Partial Access Token (one for each of the Digital Inheritance Stewards) by generating a Multi-Party Key (e.g., via Shamir Secret Sharing or similar).
      ii. Securely transmits a unique Partial Access Token to each of the Digital Inheritance Stewards who will securely store the token and its attributes.
3. Heirs
   a. Issues a Data Item Access Request to the Digital Inheritance Stewards.
4. Digital Inheritance Stewards
   a. Each Steward independently receives a Data Item Access Request and logs the event on an immutable ledger for subsequent auditing.
   b. Evaluates Data Item Access Requests for legality, compliance with the Policy, etc.
      i. Non-compliant requests are rejected (and logged).
      ii. Compliant requests:
         1. Each Steward securely transmits the corresponding Partial Access Token to the Digital Inheritance-Enabled User App on the user device specified in the Data Item Access Request.
         2. Logs the event on an immutable ledger.
5. Digital Inheritance-Enabled User App
   a. Collects each Partial Access Token from the Digital Inheritance Stewards.
   b. When all of the Partial Access Tokens are received, the disclosure process described in the Policy is performed, such as:
      i. Retrieval of the protected data item.
      ii. Secure transmission of the protected data item to a specified location.
      iii. The event is logged on an immutable ledger for subsequent auditing.

Another potentially devastating scenario occurs when users purchase digital Content Items from a vendor who ceases business operations, stops the Content Item vending business line, etc. One example of this scenario is a video vendor who sells many licenses for a period of time (e.g., 10 years) with numerous happy customers, but (for a variety of business reasons) decides to cease operations. In this scenario, what is to become of the many customers who have purchased digitally licensed content (e.g., hit the 'buy' button when purchasing)? In today's digital content purchasing market, the customer will likely lose access to the digital content they have purchased. This is due to the fact that many Terms of Service contracts stipulate that the user does not own the content they have purchased, but rather they have an ongoing license that persists at the discretion of the vendor.

Using decentralized DRM processes described above, the licenses that the users will have purchased can be made to survive the demise of the vendor from whom they purchased the Content Items and continue to operate automatically due to the cryptography and key management described above. This is accomplished by previously having moved the purchasing and licensing processes from centralized operations environments managed by a single vendor into decentralized operating locations where purchasing and licensing processes are conducted by Smart Contracts leveraging decentralized storage mechanisms.

While, users may not be able to make new purchases from a defunct vendor, or recover purchases for which they have lost the access credentials, the decentralization mechanisms can be made to indefinitely preserve a customer's access to Content Items they have purchased using access credentials that they still possess. These decentralized DRM processes protect customer's significant investments in purchased digital assets while allowing vendors to conduct business operations without the concern of adversely affecting their digital customers.

Another significant benefit to using the decentralized DRM architecture is that a vendor ceasing operations can much more easily liquidate the management of their customer base and transfer the control to an acquiring new vendor. Today, an acquiring vendor may have significant hurdles absorbing the technology processes, platforms, tools, and architecture of the vendor being acquired. This often results in significant integration and management costs spanning years of acquisition onboarding. Conversely, if the terminating vendor used the open Decentralized Identity standards and processes comprising the DRM system being presented, then the acquiring vendor could leave such management processes in their decentralized operating location and transfer of control could be performed with a series of Smart Contract updates, encryption key exchanges, and a rebranding effort. This could all be accomplished in a virtually transparent manner for customers who may only see an update saying "Vendor is under new management. Access to your digital assets has been preserved. Click here to continue enjoying your movies and purchasing new content.", which will result in much faster acquisition integrating and significant cost savings.

Figure 4:
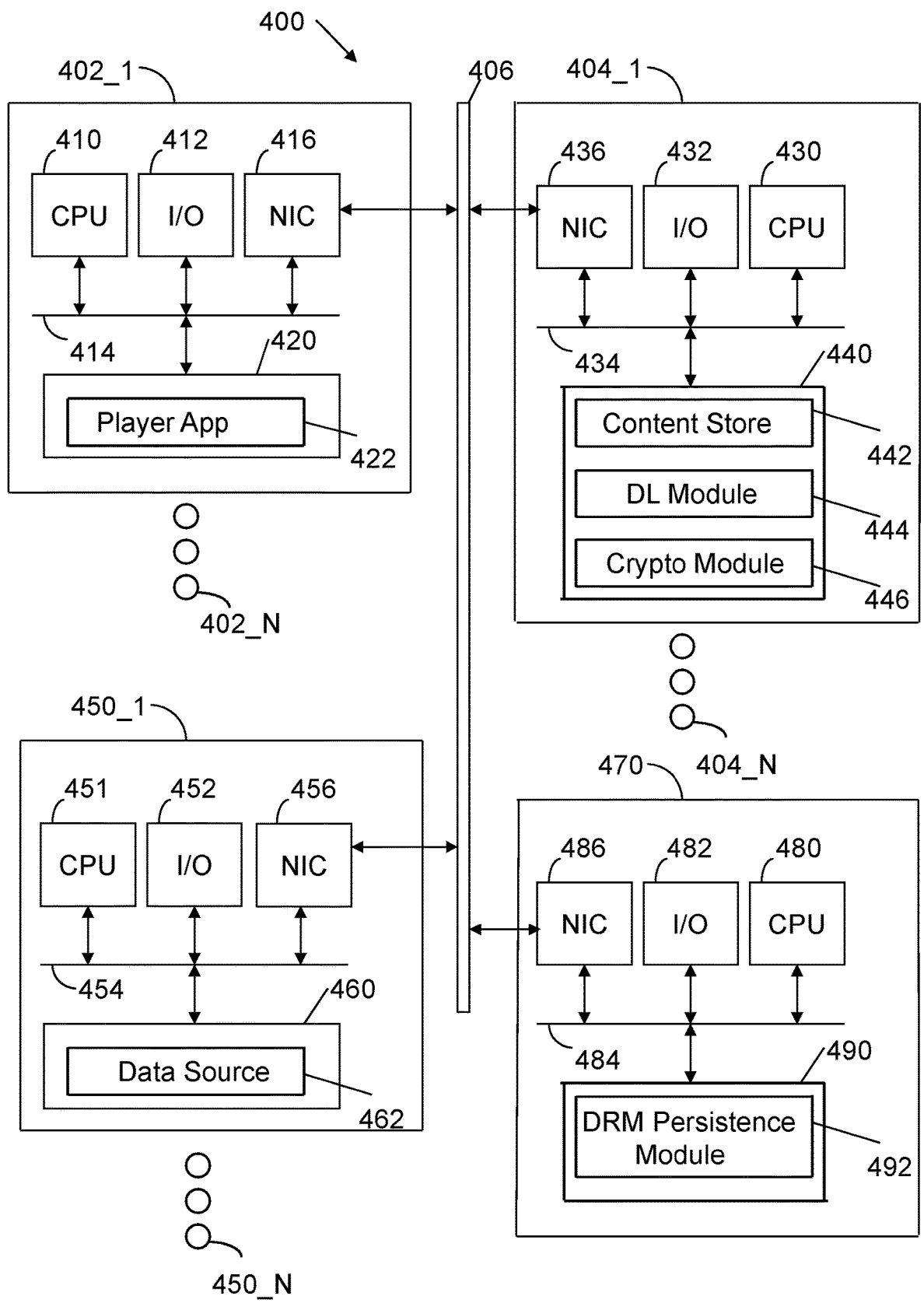
FIG. 4 illustrates a system configured in accordance with an embodiment of the invention.

FIG. 4 illustrates a system 400 configured in accordance with an embodiment of the invention. The system 400 includes client machines 402_1 through 402_N in communication with machines 404_1 through 404_N, data source machines 4501 through 450_N and machine 470 via network 406, which may be any combination of wired and wireless networks. The client machine 4021 includes a processor 410 connected to input/output devices 412 via a bus 414. The input/output devices 412 may include a keyboard, mouse, touch display and the like. A network interface circuit 416 is also connected to the bus 414 to provide connectivity to network 406. A memory 420 is also connected to the bus 414. The memory 420 stores a player app 422 with the attributes described above. For example, the player app 422 may be used to purchase a digital asset from one or more of data source machines 450_1 through 450_N. The digital asset is then stored on one or more of machines 404_1 through 404_N. That is, once purchased, the digital asset is no longer controlled by the data source machine 450_1.

The data source machine 450_1 has a processor 451, input/output devices 452, bus 454 and network interface circuit 456. A memory 460 is connected to the bus 454. The memory 460 stores a data source module 462 which has digital assets available for purchase by one or more of client machines 402_1 through 402_N.

In one embodiment, a purchased digital asset is stored in the content store 442 of machine 404_1. Machine 404_1 has a processor 430, input/output devices 432, bus 434 and network interface circuit 436. A memory 440 is connected to bus 434. The memory 440 includes a content store 442 to store a purchased digital asset. The memory 440 may also store a distributed ledger module 444 so machine 404_1 may be anode in a distributed ledger. The memory 440 may also store a crypto module 446 to implement public key and/or private key handling operations. The modules 440 may be stored in all or a subset of the machines 404_1 through 404_N.

Machine 470 manages persistent DRM operations disclosed herein. The machine 470 includes a processor 480, input/output devices 482, bus 484 and a network interface circuit 486. A memory 490 is connected to bus 484. The memory 490 stores a DRM persistence module 492 with instructions executed by processor 480 to implement operations disclosed herein. The DRM persistence module 492 does not need to be stored on a separate machine. It may be implemented on any one or more of the machines in system 400.

The DRM persistence module 492 records the purchase of a digital asset by a user at a client machine 402_1 from a data source machine 450_1. The DRM persistence module 492 archives the location of the digital asset on one or more machines of the networked machines 404_1 through 404_N. The DRM persistence module 492 associates the digital asset with a data access policy and a steward group specifying individuals to administer the data access policy. The steward group may operate any machine in system 400. When a request for a digital asset is received, the DRM persistence module 492 collects from a subset of the networked machines operated by the steward group consent from the identity stewards. In response to consent, the DRM persistence module 492 authorizes distribution of the digital asset to a network machine. For example, the DRM persistence module 492 may direct consent store 442 to distribute the digital asset to player app 422 on client device 402_1

The digital asset may be encrypted using crypto module 446. The crypto module 446 coordinates multi-party decryption of the digital asset.

Any transaction involving the digital asset may be recorded in a distributed ledger utilizing the DL module 444 on different machines 4041 through 404_N.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hard-wired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A machine, comprising:
a network interface circuit to provide connectivity to networked machines;
a processor connected to the network interface circuit; and
a memory connected to the processor and the network interface circuit, the memory storing instructions executed by the processor to:
record the purchase of a digital asset by a user at a client machine from a data source machine in network communication with the client machine,
archive the location of the digital asset on one or more machines of the networked machines, wherein the location is separate from the data source machine, associate the digital asset with a data access policy, wherein the data access policy has an associated steward group specifying individuals to administer the data access policy, receive a request for the digital asset, enforce the data access policy through programmatic control utilized by one or more of the networked machines to form a consent state, and authorize distribution of the digital asset to a networked machine in response to the consent state.

2. The machine of claim 1 wherein the digital asset is encrypted.

3. The machine of claim 2 further comprising instructions executed by the processor to coordinate multi-party decryption of the digital asset.

4. The machine of claim 1 further comprising instructions executed by the processor to record transaction data to a distributed ledger associated with at least a subset of the networked machines.

5. The machine of claim 1 wherein the user has real identity attributes or a set of digital identity attributes created by the user.

6. The machine of claim 1 wherein the user has real identity attributes or a set of machine generated digital identity attributes.

7. The machine of claim 1 wherein the consent state is formed after the collection from a subset of the networked machines, via the network interface circuit, consent from the steward group.

\* \* \* \* \*